(12) United States Patent
Okihara

(10) Patent No.: US 12,294,781 B2
(45) Date of Patent: May 6, 2025

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Kenichi Okihara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 224 days.

(21) Appl. No.: 18/317,189

(22) Filed: May 15, 2023

(65) Prior Publication Data

US 2023/0388624 A1    Nov. 30, 2023

(30) Foreign Application Priority Data

May 26, 2022    (JP) ................................ 2022-086234

(51) Int. Cl.
*H04N 23/60* (2023.01)
*H04N 23/61* (2023.01)
(Continued)

(52) U.S. Cl.
CPC ............ *H04N 23/64* (2023.01); *H04N 23/62* (2023.01); *H04N 23/61* (2023.01); *H04N 23/631* (2023.01); *H04N 23/695* (2023.01)

(58) Field of Classification Search
CPC ........ H04N 23/62; H04N 23/64; H04N 23/90; H04N 23/631; H04N 23/695; H04N 23/61
(Continued)

(56) References Cited

U.S. PATENT DOCUMENTS 9,508,263 B1 *   11/2016  Teng .................... G05D 1/0094
10,291,836 B2 *   5/2019  Taoki ..................... H04N 23/62
(Continued)

FOREIGN PATENT DOCUMENTS

| JP | 2006-074260 A | 3/2006 |
| JP | 2018-014553 A | 1/2018 |
| JP | 2019-092007 A | 6/2019 |

OTHER PUBLICATIONS

Extended European Search Report issued in corresponding EP Patent Application 23171242.3, dated Oct. 13, 2023, pp. 1-9.

*Primary Examiner* — Pritham D Prabhakher
(74) *Attorney, Agent, or Firm* — Carter, DeLuca & Farrell LLP

(57) ABSTRACT

An information processing apparatus comprises one or more processors; and one or more memories storing executable instructions which, when executed by the one or more processors, cause the image capturing control apparatus to function as: a first obtaining unit configured to obtain situation information representing a situation of image capturing, a second obtaining unit configured to obtain composition information representing image composition requested for image capturing in the situation, based on the situation information, a third obtaining unit configured to obtain a parameter of an image capture apparatus, and a generating unit configured to generate arrangement information representing proposed arrangement of an image capture apparatus that performs image capturing in the situation, based on the composition information and the parameter.

16 Claims, 15 Drawing Sheets

(51) Int. Cl.
*H04N 23/62* (2023.01)
*H04N 23/63* (2023.01)
*H04N 23/695* (2023.01)

(58) Field of Classification Search
USPC .................................................. 348/222.1
See application file for complete search history.

(56) References Cited

U.S. PATENT DOCUMENTS

| | | | |
|---|---|---|---|
| 10,375,305 B2* | 8/2019 | Shimauchi | H04N 23/633 |
| 10,606,149 B2* | 3/2020 | Ikeda | H04N 23/90 |
| 10,931,863 B2* | 2/2021 | Nadeau | H04N 23/633 |
| 11,019,282 B2* | 5/2021 | Adachi | H04N 7/181 |
| 11,245,859 B2* | 2/2022 | Adachi | H04N 5/268 |
| 11,328,473 B2* | 5/2022 | Nakazato | G06T 15/20 |
| 11,373,334 B2* | 6/2022 | Onoue | H04N 23/661 |
| 2012/0079406 A1* | 3/2012 | Medhurst | H04N 23/62 |
| | | | 715/769 |
| 2012/0327246 A1* | 12/2012 | Senior | H04N 23/62 |
| | | | 348/E7.085 |
| 2015/0296131 A1* | 10/2015 | Onsen | H04N 23/62 |
| | | | 348/207.11 |
| 2016/0050367 A1 | 2/2016 | Shimauchi | |
| 2016/0127635 A1* | 5/2016 | Taoki | H04N 7/183 |
| | | | 348/39 |
| 2018/0376078 A1 | 12/2018 | Adachi | |
| 2019/0012804 A1* | 1/2019 | Wang | G06T 7/593 |
| 2020/0092460 A1* | 3/2020 | Nadeau | H04N 23/69 |
| 2020/0265634 A1 | 8/2020 | Nakazato | |
| 2021/0074022 A1* | 3/2021 | Onoue | G06T 11/60 |

* cited by examiner

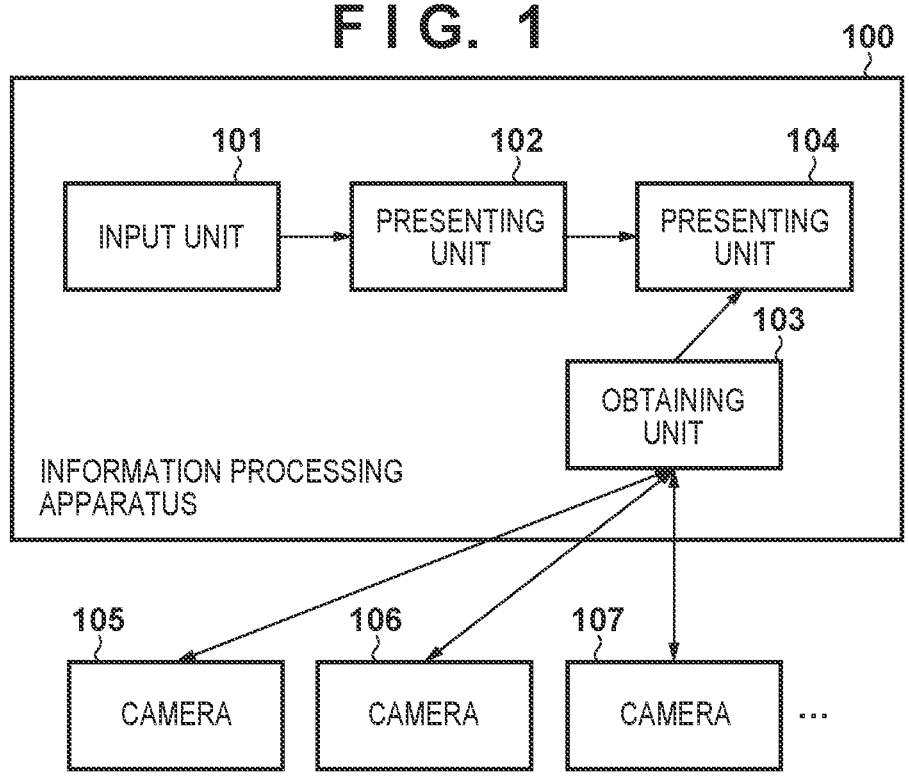
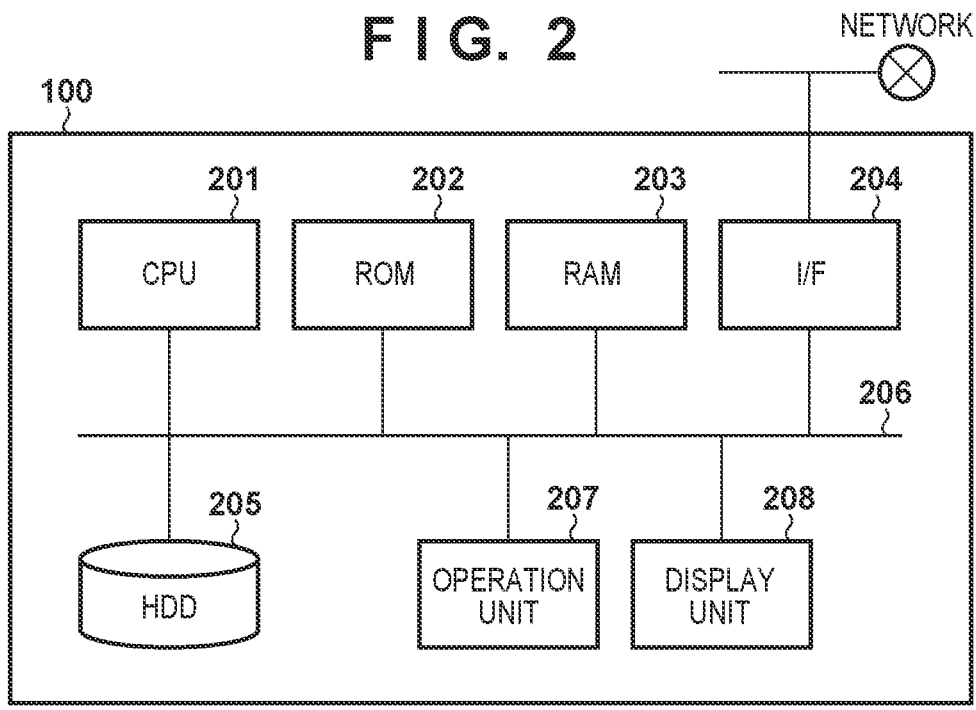

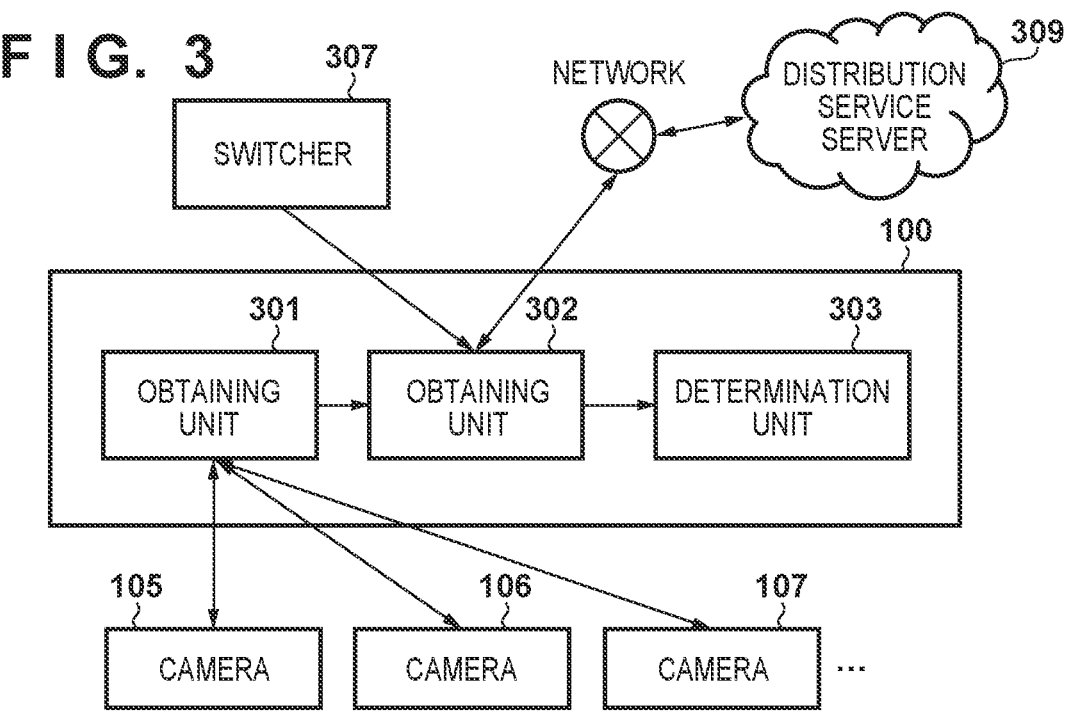
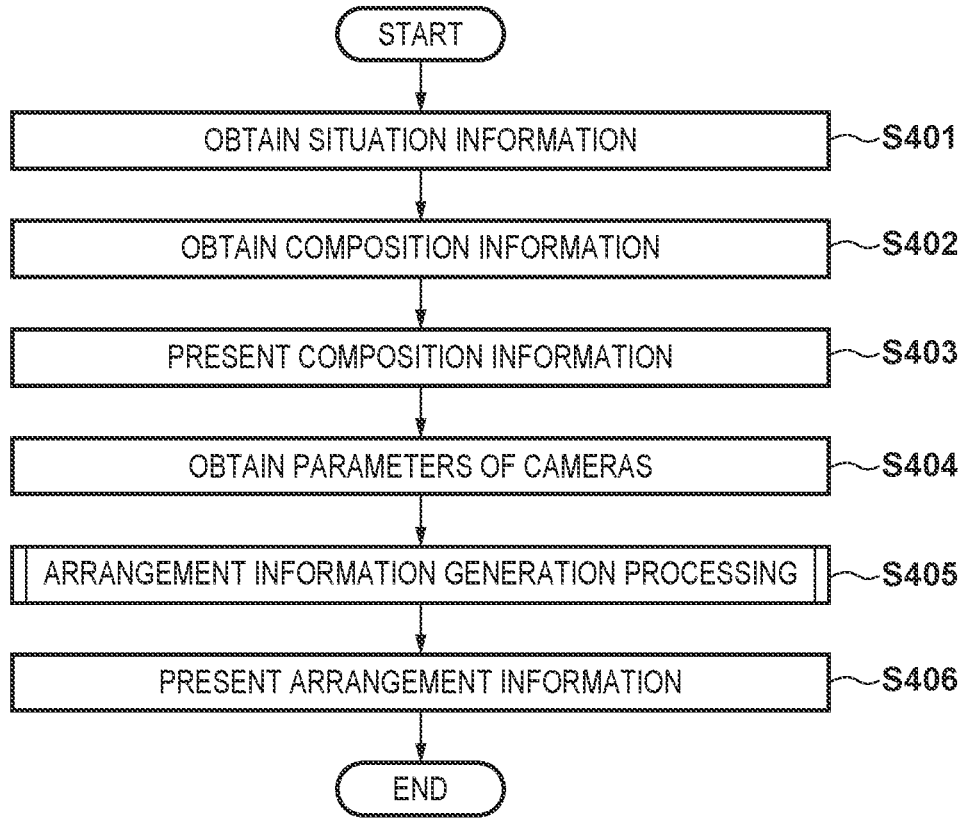

<PLEASE INPUT CONTENT DESIRED
FOR IMAGE CAPTURERING>

| CATEGORY | INTERVIEW ▽ | 602 |
| --- | --- | --- |
| NUMBER OF SUBJECTS MAIN | 1 ▽ | 603 |
| SUB | 0 ▽ | 604 |
| NUMBER OF CAMERAS — HAND-CARRY CAMERA ▽ (605) | 2 ▽ | 606 |
| PTZ CAMERA ▽ (607) | 2 ▽ | 608 |

DETERMINATION — 609

<PLEASE INPUT CONTENT DESIRED
FOR IMAGE CAPTURERING>

| CATEGORY | COOKING VIDEO DISTRIBUTION ▽ |
| --- | --- |
| NUMBER OF SUBJECTS MAIN | 2 ▽ |
| SUB | 0 ▽ |
| NUMBER OF CAMERAS — PTZ CAMERA ▽ | 1 ▽ |
| SMARTPHONE CAMERA ▽ | 1 ▽ |

DETERMINATION

FIG. 7A
| CATEGORY |
|---|
| INTERVIEW |
| COOKING VIDEO DISTRIBUTION |
| WEDDING |
| CAMPING VIDEO DISTRIBUTION |
| DOCUMENTARY |
| ... |
FIG. 7B
| TYPE OF CAMERA |
|---|
| HAND-CARRY CAMERA |
| PTZ CAMERA |
| SMARTPHONE CAMERA |
| DRONE CAMERA |
| ... |
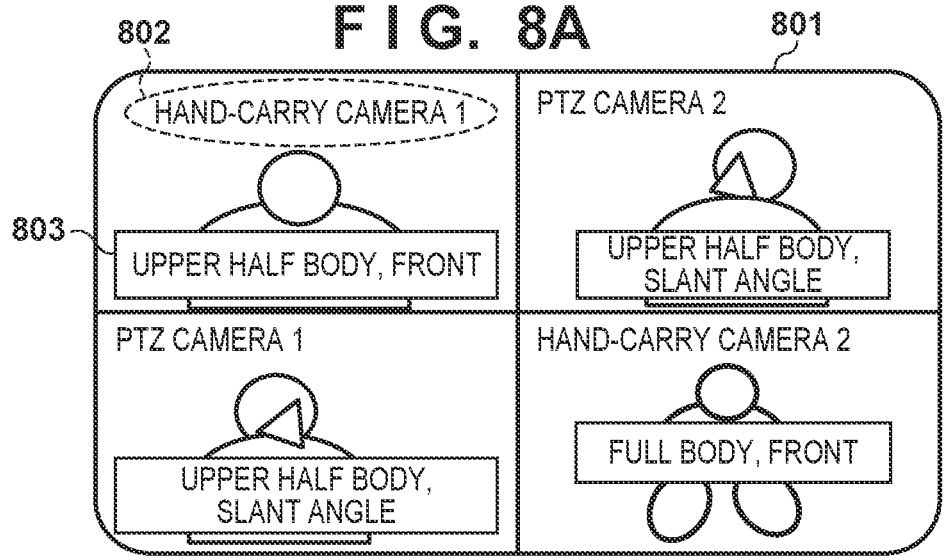
FIG. 8A
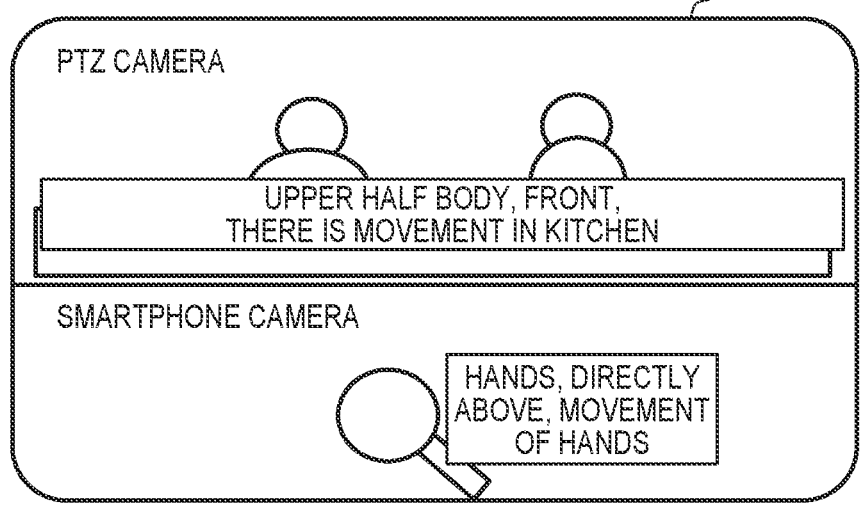
FIG. 8B

FIG. 9A

| IMAGE CAPTURING AREA OF SUBJECT |
|---|
| UPPER HALF BODY |
| LOWER HALF BODY |
| HANDS |
| ... |

FIG. 9B

| ANGLE OF SUBJECT |
|---|
| PLUS OR MINUS 10 DEGREES FROM FRONT |
| PLUS OR MINUS 30 DEGREES FROM FRONT |
| PLUS OR MINUS 60 DEGREES FROM FRONT |
| PLUS OR MINUS 10 DEGREES FROM SLANT ANGLE OF 45 DEGREES |
| PLUS OR MINUS 10 DEGREES FROM BACK |
| ... |

FIG. 9C

| MOVEMENT AREA OF SUBJECT |
|---|
| FIXED |
| PORTION OF IMAGE CAPTURING LOCATION |
| ENTIRE REGION OF IMAGE CAPTURING LOCATION |
| ... |

F I G. 12

| INFORMATION NAME | OVERVIEW | DATA EXAMPLE (CAMERA 1) | CONDITION FOR REARRANGEMENT |
|---|---|---|---|
| POSITION INFORMATION | POSITION INFORMATION OBTAINED FROM GPS OR MAP | 35.5670 (LATITUDE) 139.6824 (LONGITUDE) | OUTSIDE FOLLOWING RANGE 35.56 TO 35.57 (LATITUDE) 139.68 TO 139.69 (LONGITUDE) |
| PTZ CONTROL INFORMATION | PAN, TILT, AND ZOOM CONTROL INFORMATION | 300° (PAN ANGLE) 45° (TILT ANGLE) 2 TIMES (OPTICAL ZOOM) | WITHIN FOLLOWING RANGE OF LIMIT VALUES 330° TO 350° (PAN ANGLE LIMIT) 80° TO 90° (TILT ANGLE LIMIT) 3.3 TIMES TO 3.5 TIMES (OPTICAL ZOOM LIMIT) |
| NUMBER OF PIECES OF APPLIED METADATA | FOR EXAMPLE, NUMBER OF TIMES SUBJECT PERFORMS SPECIFIC MOVEMENT (SHOOTING OR DRIBBLING) | 30 | 10 OR BELOW |

F I G. 13

| INFORMATION NAME | OVERVIEW | DATA EXAMPLE | CONDITION FOR REARRANGEMENT |
|---|---|---|---|
| SWITCHING RATIO | RATIO OF MAIN VIDEO OF EACH CAMERA ACCORDING TO SWITCHING | CAMERA A : 10% CAMERA B : 40% CAMERA C : 50% | LESS THAN 10% |
| DISTRIBUTION RATIO | RATIO ALLOCATED TO DISTRIBUTION INCLUDING SUB VIDEO | CAMERA A : 20% CAMERA B : 30% CAMERA C : 50% | LESS THAN 25% |
| RATIOS OF NUMBERS OF PIECES OF APPLIED METADATA | RATIOS OF NUMBERS OF PIECES OF APPLIED METADATA | CAMERA A: 7% (2 PIECES), CAMERA B: 37% (10 PIECES), CAMERA C: 55% (15 PIECES) | LESS THAN 10% |

FIG. 18

| CATEGORY | SITUATION INFORMATION | | | COMPOSITION INFORMATION | | |
|---|---|---|---|---|---|---|
| | NUMBER OF SUBJECTS | TYPE OF CAMERA | IMAGE CAPTURING AREA OF SUBJECT | RANGE OF ANGLE OF SUBJECT | MOVEMENT AREA OF SUBJECT | |
| INTERVIEW | MAIN SUBJECT 1 PERSON SUB-SUBJECT 0 PERSON | HAND-CARRY CAMERA | UPPER HALF BODY | PLUS OR MINUS 10 DEGREES FROM FRONT | FIXED | 1801 |
| INTERVIEW | MAIN SUBJECT 1 PERSON SUB-SUBJECT 0 PERSON | PTZ CAMERA | UPPER HALF BODY | PLUS OR MINUS 10 DEGREES FROM SLANT ANGLE OF 45 DEGREES | FIXED | |
| INTERVIEW | MAIN SUBJECT 1 PERSON SUB-SUBJECT 0 PERSON | SMARTPHONE CAMERA | UPPER HALF BODY | PLUS OR MINUS 10 DEGREES FROM FRONT | FIXED | |
| COOKING VIDEO DISTRIBUTION | MAIN SUBJECT 2 PERSONS SUB-SUBJECT 0 PERSON | PTZ CAMERA | UPPER HALF BODY | PLUS OR MINUS 30 DEGREES FROM FRONT | MOVEMENT IN KITCHEN | 1802 |
| COOKING VIDEO DISTRIBUTION | MAIN SUBJECT 2 PERSONS SUB-SUBJECT 0 PERSON | SMARTPHONE CAMERA | HANDS | PLUS OR MINUS 30 DEGREES FROM FRONT | ONLY HANDS MOVE | |
| | | | (FOLLOWING IS ABBREVIATED) | | | |

F I G. 19

| INFORMATION NAME | OVERVIEW | DATA EXAMPLE |
|---|---|---|
| PTZ CONTROL INFORMATION | PAN, TILT, AND ZOOM CONTROL INFORMATION | 350°(RANGE OF PAN ANGLE) 90°(RANGE OF TILT ANGLE) 3.5 TIMES (OPTICAL ZOOM) |
| POSITION INFORMATION | POSITION INFORMATION OBTAINED FROM GPS OR MAP | 35.5670 (LATITUDE) 139.6824 (LONGITUDE) |
| MOVEMENT AREA INFORMATION | MOVEMENT AREA OF PERSON HOLDING HAND-CARRY CAMERA OR MOVEMENT AREA OF DRONE | 2m AROUND POSITION INFORMATION |

INFORMATION PROCESSING APPARATUS, INFORMATION PROCESSING METHOD, AND NON-TRANSITORY COMPUTER-READABLE STORAGE MEDIUM

BACKGROUND

Field

The present disclosure relates to a technique for generating arrangement information of image capture apparatuses.

Description of the Related Art

Several methods for presenting arrangement of at least one image capture apparatus have been proposed. Examples of the image capture apparatus include a hand-carry camera, a PTZ camera, and a camera mounted in a smartphone or a drone. In the technique disclosed in Japanese Patent Laid-Open No. 2019-92007, appropriate arrangement of a plurality of image capture apparatuses that are used for generating a virtual viewpoint image is output based on constraint information such as areas in which the image capture apparatuses can be installed and the number of image capture apparatuses. In addition, in the technique disclosed in Japanese Patent Laid-Open No. 2018-14553, when a reduction scale, a ceiling height, and conditions of algorithms are input and an object at a detection position is designated, installation positions at which cameras can be installed are displayed in a layout guide.

As described above, techniques for presenting appropriate arrangement of image capture apparatuses based on information regarding the image capture apparatuses themselves, buildings in the surrounding region, and the like have been conventionally proposed. However, consideration has not been given to arrangement of image capture apparatuses that is suitable for a situation of a video image work that the user desires to create, or rearrangement of the image capture apparatuses based on a video image that has been actually captured.

SUMMARY

The present disclosure provides a technique for generating proposed arrangement of image capture apparatuses for making it possible to capture a video image that has an appropriate image composition suitable for a situation of image capturing.

According to the first aspect of the present invention, there is provided an information processing apparatus comprising: one or more processors; and one or more memories storing executable instructions which, when executed by the one or more processors, cause the image capturing control apparatus to function as: a first obtaining unit configured to obtain situation information representing a situation of image capturing; a second obtaining unit configured to obtain composition information representing image composition requested for image capturing in the situation, based on the situation information; a third obtaining unit configured to obtain a parameter of an image capture apparatus; and a generating unit configured to generate arrangement information representing proposed arrangement of an image capture apparatus that performs image capturing in the situation, based on the composition information and the parameter.

According to the second aspect of the present invention, there is provided an information processing method that is performed by an information processing apparatus, the method comprising: obtaining situation information representing a situation of image capturing; obtaining composition information representing image composition requested for image capturing in the situation, based on the situation information; obtaining a parameter of an image capture apparatus; and generating arrangement information representing proposed arrangement of an image capture apparatus that performs image capturing in the situation, based on the composition information and the parameter.

According to the third aspect of the present invention, there is provided a non-transitory computer-readable storage medium that stores a computer program for causing a computer to function as: a first obtaining unit configured to obtain situation information representing a situation of image capturing; a second obtaining unit configured to obtain composition information representing image composition requested for image capturing in the situation, based on the situation information; a third obtaining unit configured to obtain a parameter of an image capture apparatus; and a generating unit configured to generate arrangement information representing proposed arrangement of an image capture apparatus that performs image capturing in the situation, based on the composition information and the parameter.

Further features of the present disclosure will become apparent from the following description of exemplary embodiments with reference to the attached drawings

BRIEF DESCRIPTION OF THE DRAWINGS

FIG. 1 is a block diagram showing a configuration example of a system.

FIG. 2 is a block diagram showing an exemplary hardware configuration of an information processing apparatus 100.

FIG. 3 is a block diagram showing a configuration example of a system.

FIG. 4 is a flowchart of processing that is performed by the information processing apparatus 100.

FIG. 6A is a diagram showing a display example of a GUI.

FIG. 6B is a diagram showing a display example of a GUI.

FIG. 7A is a diagram showing a list of categories.

FIG. 7B is a diagram showing a list of types of cameras.

FIG. 8A is a diagram showing a presenting example of a video image that is based on composition information.

FIG. 8B is a diagram showing a presenting example of a video image that is based on composition information.

FIG. 9A is a diagram showing an example of an image capturing area of a subject.

FIG. 9B is a diagram showing an example of the range of an angle of a camera relative to a subject.

FIG. 9C is a diagram showing an example of a range in which a subject can move.

FIG. 12 is a diagram showing a configuration example of individual information of a camera.

FIG. 13 is a diagram showing an example of information regarding image capture apparatuses.

FIG. 18 is a diagram showing a configuration example of a database.

FIG. 19 is a diagram showing a configuration example of parameters of a camera.

DESCRIPTION OF THE EMBODIMENTS

Figure 5:
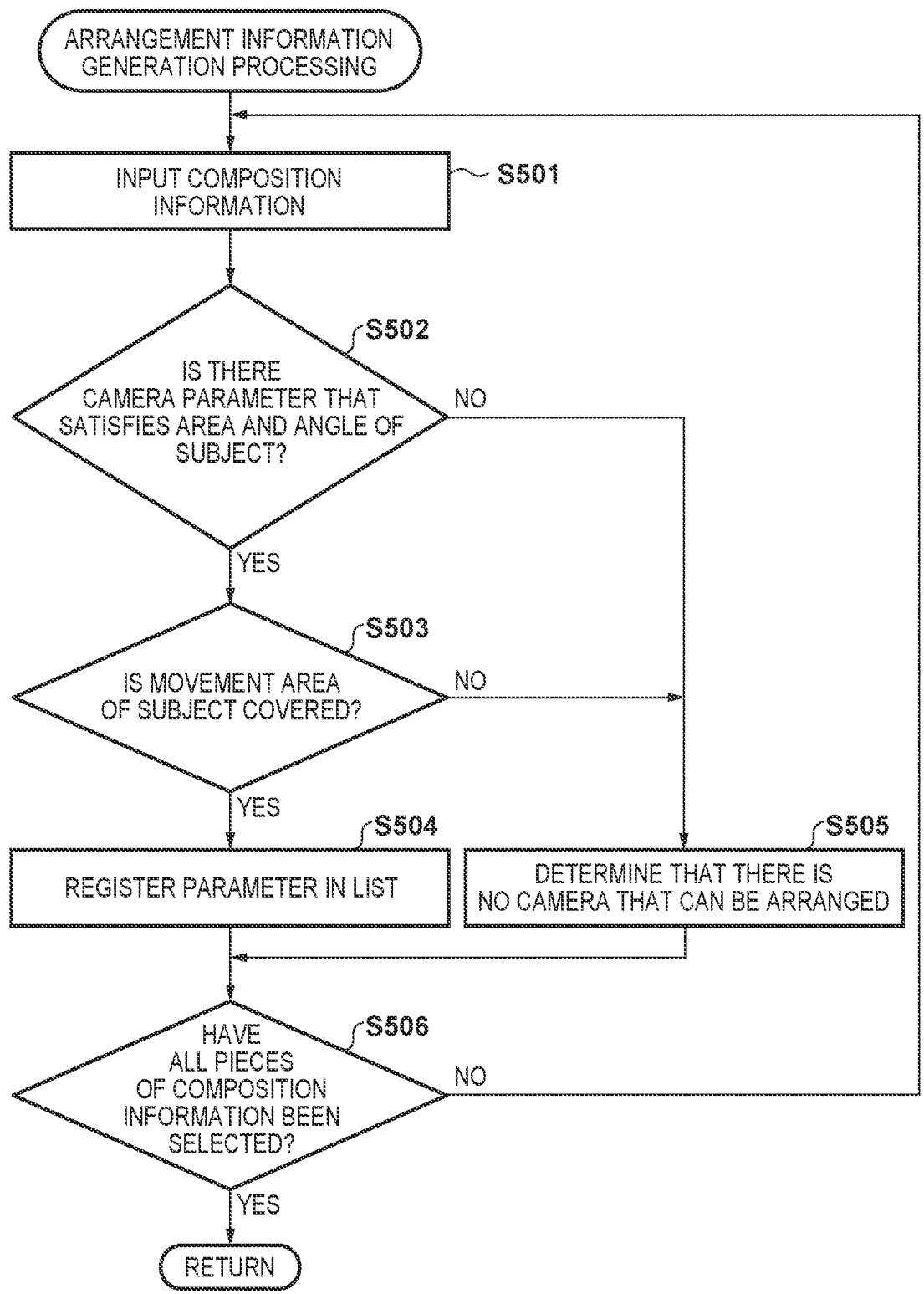
FIG. 5 is a flowchart showing detailed processing in step S405.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate.

Furthermore, in the attached drawings, the same reference numerals are given to the same or similar configurations, and redundant description thereof is omitted.

First Embodiment

In the present embodiment, a description will be given of an information processing apparatus for generating, before starting image capturing using image capture apparatuses, proposed arrangement of the image capture apparatuses for making it possible to capture a video image that has an appropriate structure suitable for a situation of the image capturing, and presenting the proposed arrangement to the user.

First, an exemplary hardware configuration of an information processing apparatus 100 according to the present embodiment will be described with reference to the block diagram in FIG. 2. A computer apparatus such as a PC (personal computer), a smartphone, or a tablet terminal apparatus is applicable to the information processing apparatus 100.

A CPU 201 executes various types of processing using a computer program or data stored in a ROM 202 or a RAM 203. Accordingly, the CPU 201 controls overall operations of the information processing apparatus 100, and executes or controls various types of processing which will be described as being performed by the information processing apparatus 100.

The ROM 202 stores setting data of the information processing apparatus 100, a computer program or data related to start of the information processing apparatus 100, a computer program or data related to basic operations of the information processing apparatus 100, and the like.

The RAM 203 includes an area for storing a computer program or data loaded from the ROM 202 or an HDD (hard disk drive) 205, and an area for storing data received from the outside via an I/F 204. Moreover, the RAM 203 includes a work area that is used when the CPU 201 executes various types of processing. In this manner, the RAM 203 can provide various areas as appropriate.

The I/F 204 is a communication interface for connecting the information processing apparatus 100 to a wired and/or wireless network. The network is a network such as a LAN or the Internet. In the present embodiment, a plurality of cameras are connected to the network. Thus, the information processing apparatus 100 can transmit/receive data to/from cameras connected to the network, via the I/F 204. Note that the I/F 204 may include an interface for transmitting/receiving data to/from a device such as a USB device.

The HDD 205 is an example of a large-capacity information storage unit. The HDD 205 stores an OS (operating system), a computer program or data for causing the CPU 201 to execute or control various types of processing to be described as being performed by the information processing apparatus 100, and the like. The computer program or data stored in the HDD 205 is loaded in the RAM 203 as appropriate in accordance with control performed by the CPU 201, and is to be processed by the CPU 201.

An operation unit 207 is a user interface such as a keyboard, a mouse, or a touch panel, and various instructions can be input to the CPU 201 by the user performing an operation on the operation unit 207.

A display unit 208 includes a liquid crystal screen or a touch panel screen, and can display a result of processing performed by the CPU 201, as an image, text, and the like. Note that the display unit 208 may also be a projection apparatus such as a projector that projects an image and text.

The CPU 201, the ROM 202, the RAM 203, the I/F 204, the HDD 205, the operation unit 207, and the display unit 208 are all connected to a system bus 206. Note that the configuration shown in FIG. 2 is an example of a configuration that is applicable to the information processing apparatus 100 according to the present embodiment, and there is no limitation to the configuration shown in FIG. 2.

Next, the block diagram in FIG. 1 shows a configuration example of a system according to the present embodiment that includes the information processing apparatus 100. In the system according to the present embodiment, as shown in FIG. 1, a plurality of cameras (image capture apparatuses) that include cameras 105, 106, and 107 are connected to the information processing apparatus 100 via the above-described network.

Various types of cameras such as a PTZ camera, a user-transportable camera (a digital camera or a camera mounted in a smartphone or a tablet terminal apparatus), and a camera mounted in a drone can be applied as the plurality of cameras that include the cameras 105, 106, and 107. The PTZ camera is a camera that can change pan, tilt, and zoom thereof in order to recognize a subject and bring the subject into the field of view. The information processing apparatus 100 specifies, from these cameras, a camera that can capture a video image that has an appropriate configuration suitable for a situation of image capturing, and presents proposed arrangement of the specified camera to the user.

As shown in FIG. 1, the information processing apparatus 100 includes an input unit 101, a presenting unit 102, an obtaining unit 103, and a presenting unit 104. In the present embodiment, a case will be described in which these functional units are implemented by software (a computer program). A description may be given below assuming that these functional units perform processing, but, as a matter of fact, functions of the functional units are realized by the CPU 201 executing computer programs corresponding to the functional units. Note that, one or more out of these functional units may be implemented by hardware.

Processing that is performed by the information processing apparatus 100 in order to generate proposed arrangement of cameras that makes it possible to capture a video image that has an appropriate configuration suitable for a situation of image capturing, and present the proposed arrangement to the user will be described with reference to the flowchart in FIG. 4.

In step S401, the input unit 101 obtains situation information representing a situation of image capturing. In the present embodiment, as an example, the input unit 101 causes the display unit 208 to display a GUI (graphical user interface) for inputting situation information, and obtains situation information input by the user performing an operation on the operation unit 207.

FIG. 6A shows a display example of a GUI 601 when "interview" is selected as a category of content desired for image capturing, and FIG. 6B shows a display example of a GUI 610 when "cooking video distribution" is selected as a category of content desired for image capturing.

A pull-down menu 602 is a menu for selecting a category of content desired for image capturing. When the user performs an operation on the operation unit 207 and points to the pull-down menu 602, a list of categories illustrated in FIG. 7A is displayed, and the user selects one category from this list using the operation unit 207. FIG. 6A shows a display example of a GUI when "interview" is selected from this list, and FIG. 6B shows a display example of a GUI when "cooking video distribution" is selected from this list.

A pull-down menu 603 is a menu for selecting the number of subjects (in the present embodiment, a subject is a person, and thus the number of subjects is the number of persons) that are to be captured in an image as main subjects. When the user performs an operation on the operation unit 207, and points to the pull-down menu 603, a list of integers of 0 or greater is displayed, and the user selects one integer from this list using the operation unit 207.

A pull-down menu 604 is a menu for selecting the number of subjects (in the present embodiment, a subject is a person, and thus the number of subjects is the number of persons) that are is to be captured in an image as sub subjects. When the user performs an operation on the operation unit 207 and points to the pull-down menu 604, a list of integers of 0 or greater is displayed, and the user selects one integer from this list using the operation unit 207.

Pull-down menus 605 and 607 are menus for selecting a type of camera connected to the information processing apparatus 100. When the user performs an operation on the operation unit 207 and points to the pull-down menu 605 or the pull-down menu 607, the list of types of cameras illustrated in FIG. 7B is displayed. A "hand-carry camera" is a camera that can be carried by a person and capture an image. A "PTZ camera" has been described above. A "smartphone camera" is a camera mounted in a smartphone. A "drone camera" is a camera mounted in a drone. The user selects one type from this list using the operation unit 207.

A pull-down menu 606 is a menu for selecting the number of cameras of the type selected using the pull-down menu 605. When the user performs an operation on the operation unit 207 and points to the pull-down menu 606, a list of integers of 0 or greater is displayed, and the user selects one from this list using the operation unit 207.

A pull-down menu 608 is a menu for selecting the number of cameras of the type selected using the pull-down menu 607. When the user performs an operation on the operation unit 207 and points to the pull-down menu 608, a list of integers of 0 or greater is displayed, and the user selects one from this list using the operation unit 207.

Next, when the user performs an operation on the operation unit 207 to point to a determination button 609, the input unit 101 obtains the pieces of information selected using the above-described pull-down menus in the GUI 601, as situation information of image capturing for an interview.

The configuration of the GUI 610 in FIG. 6B is similar to that of the GUI 601 in FIG. 6A. Also, the operating method of the GUI 610 is similar to the operating method of the GUI 601 in FIG. 6A. When the user performs an operation on the operation unit 207 to point to a determination button in the GUI 610, the input unit 101 obtains pieces of information selected using the pull-down menus in the GUI 610, as situation information of image capturing for cooking video distribution.

In step S402, the presenting unit 102 obtains composition information that defines image composition requested for image capturing in a situation of the category selected using the pull-down menu 602, based on the situation information obtained by the input unit 101.

In the present embodiment, a database illustrated in FIG. 18 is registered in the HDD 205, and the presenting unit 102 obtains, from this database, composition information corresponding to the situation information obtained by the input unit 101. Composition information corresponding to various types of situation information is registered in the database in FIG. 18.

Sets of situation information and composition information enclosed by a frame 1801 are referred to when the category of situation is "interview". The situation information in the first row in the frame 1801 is situation information in which "interview" is selected as a category, "the number of subject persons that are to be captured in an image as main subjects is one, and the number of subject persons that are to be captured in an image as sub-subjects is 0" is selected as the number of subject persons, and "hand-carry camera" is selected as a type of camera, for example. Composition information corresponding to this situation information is composition information in which the "upper half body of subject" is set as an image capturing area of the subject, "plus or minus 10 degrees from the front" is set as the range of an angle of a camera relative to the subject, and "fixed" is set as an area in which the subject can move.

Sets of situation information and composition information enclosed by a frame 1802 are referred to when the category of situation is "cooking video distribution". The situation information in the first row in the frame 1802 is situation information in which "cooking video distribution" is selected as a category, "the number of subject persons that are to be captured in an image as main subjects is two, and the number of subject persons that are to be captured in an image as sub-subjects is 0" is selected as the number of subject persons, and a "PTZ camera" is selected as a type of camera, for example. Composition information corresponding to the situation information is composition information in which the "upper half body of subject" is set as an image capturing area of each subject, "plus or minus 30 degrees from the front" is set as the range of an angle of a camera relative to the subject, and "move in kitchen" is set as an area in which the subject can move.

As shown in FIG. 9A, various image capturing areas may be used as an image capturing area of a subject. Also, as shown in FIG. 9B, various ranges of an angle may be used as the range of an angle of a camera relative to a subject. Also, as shown in FIG. 9C, various areas may be used as an area in which a subject can move. Note that a plurality of pieces of composition information may be registered in the database for one piece of situation information.

The database in FIG. 18 is created by a system developer in advance and is registered in the HDD 205, for example. However, a configuration may also be adopted in which examples of composition information corresponding to actual situation information are collected from users as needed, and the database is updated by, for example, updating, adding, or deleting information in the database as needed.

Note that, when composition information corresponding to situation information obtained by the input unit 101 is not found in the database, the presenting unit 102 may obtain composition information corresponding to situation information similar to the situation information obtained by the input unit 101. When there is composition information corresponding to situation information in which a category and a subject match those in the situation information obtained by the input unit 101 but a type of camera is different, namely "hand-carry camera", instead of "smartphone camera", for example, then the composition information is obtained. This determination on similarity may be performed using any technique, and, for example, may be performed using a known AI technique.

In step S403, the presenting unit 102 causes the display unit 208 to display a video image that is based on the composition information obtained from the database in step S402, thereby presenting the composition information to the user. The video image includes an image that shows appearance of a subject captured in accordance with the composition information, or the image capturing area and the range of an angle included in the composition information, for example.

FIG. 8A shows a presenting example of a video image that is based on composition information corresponding to the situation information shown in FIG. 6A. In the situation information in FIG. 6A, the category is "interview", the number of subject persons is "the number of subject persons that are to be captured in an image as main subjects is one, and the number of subject persons that are to be captured in an image as sub-subjects is 0", the type of camera is "hand-carry camera and PTZ camera", and the number of cameras is "the number of hand-carry cameras is two, and the number of PTZ cameras is two".

Thus, regarding one of the hand-carry cameras (a hand-carry camera 1), a video image that is based on composition information corresponding to situation information (category: "interview", subject: "the number of subject persons that are to be captured in an image as main subjects is one, and the number of subject persons that are to be captured in an image as sub-subjects is 0", and the type of camera: "hand-carry camera") is displayed in an upper left region of a display region 801 of the display unit 208. The name of the one hand-carry camera is displayed in a region 802, and the image capturing area and the range of an angle included in the composition information are displayed in a region 803.

Regarding the other hand-carry camera (a hand-carry camera 2), a video image that is based on composition information (different from the composition information for the one hand-carry camera) corresponding to situation information (category: "interview", subject: "the number of subject persons that are to be captured in an image as main subjects is one, the number of subject persons that are to be captured in an image as sub-subjects is 0", and type of camera: "hand-carry camera") is displayed in a lower right region of the display region 801 of the display unit 208.

Regarding one of the PTZ cameras (a PTZ camera 1), a video image that is based on composition information corresponding to situation information (category: "interview", subject: "the number of subject persons that are to be captured in an image as main subjects is one, and the number of subject persons that are to be captured in an image as sub-subjects is 0", and type of camera: "PTZ camera") is displayed in a lower left region in the display region 801 of the display unit 208.

Regarding the other PTZ camera (a PTZ camera 2), a video image that is based on composition information (different from the composition information for the one PTZ camera) corresponding to situation information (category: "interview", subject: "the number of subject persons that are to be captured in an image as main subjects is one, and the number of subject persons that are to be captured in an image as sub-subjects is 0", and type of camera: "PTZ camera") is displayed in an upper right region of the display region 801 of the display unit 208.

FIG. 8B shows a presenting example of a video image that is based on composition information corresponding to the situation information shown in FIG. 6B. In the situation information in FIG. 6B, the category is "cooking video distribution", the number of subject persons is "the number of subject persons that are to be captured in an image as main subjects is two, and the number of subject persons that are to be captured in an image as sub-subjects is 0", the type of camera is "PTZ camera and smartphone camera", and the number of cameras is "the number of PTZ cameras is one, and the number of smartphone cameras is one".

Thus, regarding the PTZ camera, a video image that is based on composition information corresponding to situation information (category: "cooking video distribution", the number of subject persons: "the number of subject persons that are to be captured in an image as main subjects is two, and the number of subject persons that are to be captured in an image as sub-subjects is 0", and the type of camera: "PTZ camera" is displayed in an upper region in a display region 804 of the display unit 208.

Regarding the smartphone camera, a video image that is based on composition information corresponding to situation information (category: "cooking video distribution", the number of subject persons: "the number of subject persons that are to captured in an image as main subjects is two, and the number of subject persons that are to captured in an image as sub-subject is 0", and the type of camera: "smartphone camera") is displayed in a lower region of the display region 804 of the display unit 208.

Note that a method for displaying a video image that is based on composition information corresponding to situation information is not limited to the display methods shown in FIGS. 8A and 8B, and, for example, a video image may be switched and displayed for each camera, or a video image captured by a camera selected by the user using the operation unit 207 may be displayed. In addition, display of a video image that is based on composition information corresponding to situation information may be an option, or display/hide may be set/switched by the user performing an operation on the operation unit 207.

In step S404, the obtaining unit 103 obtains parameters of cameras connected to the information processing apparatus 100. FIG. 19 shows a configuration example of parameters of a camera.

PTZ control information is information included in parameters of the PTZ camera, and represents the controllable ranges of pan, tilt, and zoom. The PTZ control information is obtained from the PTZ camera via a network, for example.

Position information is information representing the position of a camera. A method for obtaining the position information is not limited to a specific obtaining method, and, for example, the position information may be obtained from a GPS of the camera or a GPS receiver attached to the camera, or may be obtained from a map.

Movement area information is information that defines an area in which a camera can be moved. The movement area information of a hand-carry camera is information representing an area in which a person carrying the hand-carry camera can move (a preset ordinary movable area, or a physically movable area that can be grasped from position information or map data), for example. The physically movable area refers to a region excluding places where a person cannot bring a camera such as a wall and the ocean. When there is no map data, and movement area information cannot be grasped without actually capturing an image, information representing an ordinary movable area is used as movement area information. In addition, the movement area information of a drone camera is information representing an area in which a drone that has the drone camera mounted therein can move. Regarding obtaining of movement area information, for example, movement area information held in the HDD 205 in advance may be obtained, or movement area information held in an apparatus on a network may be obtained.

In step S405, the presenting unit 104 generates arrangement information representing proposed arrangement of cameras that are to perform image capturing in a situation of the category selected using the pull-down menu 602, using the composition information obtained by the presenting unit 102 and the parameters of the cameras obtained by the obtaining unit 103. The processing in step S405 will be described later in detail with reference to FIG. 5.

Figure 10A:
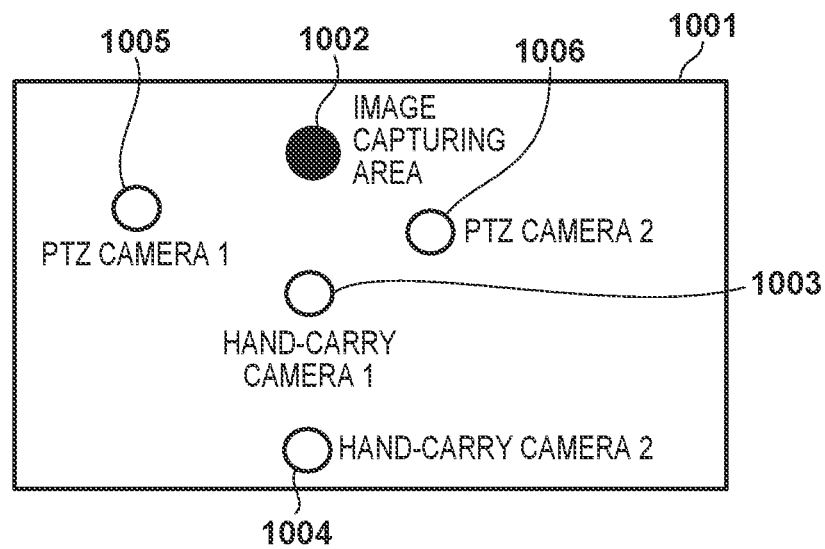
FIG. 10A is a diagram showing a presenting example of arrangement information.
Figure 10B:
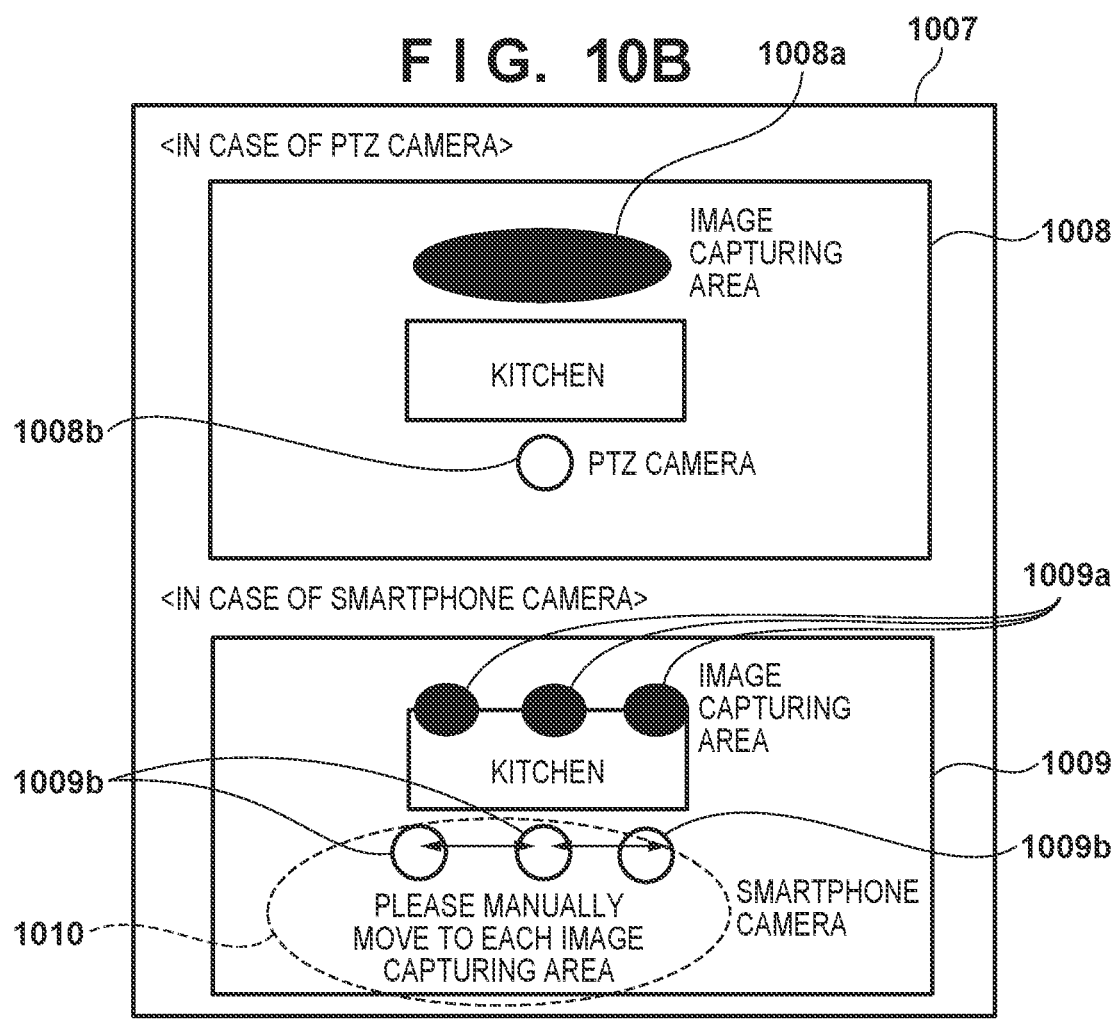
FIG. 10B is a diagram showing a presenting example of arrangement information.

Next, in step S406, the presenting unit 104 presents the arrangement information generated in step S405 to the user. FIGS. 10A and 10B show presenting examples of the arrangement information. FIG. 10A shows an example of a layout image 1001 that is based on the arrangement information corresponding to the situation information obtained on the GUI 601 in FIG. 6A. The layout image 1001 is an image representing proposed arrangement of cameras when an image of an interview is captured using the hand-carry camera 1, the hand-carry camera 2, the PTZ camera 1, and the PTZ camera 2.

Blank circles 1003 to 1006 respectively represent the positions of the hand-carry camera 1, the hand-carry camera 2, the PTZ camera 1, and the PTZ camera 2, which are specified by the position information included in the parameters of the cameras. Note that, if orientations or fields of view of the cameras can be obtained in addition to the positions of the cameras, objects representing the orientations or fields of view (arrow objects directed in orientations/directions, fan-shaped objects representing ranges of fields of view, and the like) may also be displayed. The same applies in a layout image 1007 to be described later.

A black circle 1002 represents the image capturing area of the hand-carry camera 1, the hand-carry camera 2, the PTZ camera 1, and the PTZ camera 2. In a case of "interview", according to the composition information for the hand-carry camera 1, the hand-carry camera 2, the PTZ camera 1, and the PTZ camera 2, an area of a subject is "upper half body", and an area in which the subject can move is "fixed". However, the subject at a fixed position in an actual space corresponds to the image capturing area. Thus, the black circle 1002 represents the area of the subject at this fixed position as an image capturing area.

FIG. 10B shows an example of the layout image 1007 that is based on the arrangement information corresponding to the situation information obtained on the GUI 602 in FIG. 6B. The layout image 1007 is an image representing proposed arrangement of a PTZ camera and a smartphone camera when an image of a kitchen (where a chef is cooking) is captured using the PTZ camera and the smartphone camera. Note that the image capturing area of the PTZ camera and the image capturing area of the smartphone camera are different, and thus the layout image 1007 is an image that includes an image 1008 showing proposed arrangement of the PTZ camera, and an image 1009 showing proposed arrangement of the smartphone camera.

A blank circle 1008*b* in the image 1008 represents the position of the PTZ camera, and is specified by position information included in the parameters of the PTZ camera. A black oval 1008*a* represents an image capturing area of the PTZ camera. In a case of cooking video distribution, according to the composition information for the PTZ camera, an area of a subject is "upper half body", and an area in which the subject can move is an area of "kitchen", and thus an area in an actual space in which the subject can move corresponds to the image capturing area. Thus, the black oval 1008*a* represents this image capturing area.

Blank circles 1009*b* in the image 1009 represent several positions (in FIG. 10B, three positions) in an area in which the smartphone camera can be moved. In a case of cooking video distribution, according to the composition information for the smartphone camera, an area of a subject is "hands", and an area in which the subject can move is "movement area of hands only". However, the area in which the smartphone camera can be moved is an area in which it is possible to capture an image of an area in an actual space in which the subject can move his or her hands for cooking. The blank circles 1009*b* represent several positions (in FIG. 10B, three positions) in an "area in which it is possible to capture an image of an area in an actual space in which the subject can move his or her hands for cooking. Black ovals 1009*a* represent image capturing areas of the smartphone camera. The image capturing areas of the smartphone camera correspond to the above "area in which it is possible to capture an image of an area in an actual space in which the subject can move his or her hands for cooking".

Next, the aforementioned processing of step S405 will be described in detail with reference to the flowchart in FIG. 5. In step S501, the presenting unit 104 obtains the composition information obtained by the presenting unit 102.

In step S502, the presenting unit 104 selects an unselected piece of composition information from the composition information obtained in step S501, as selected composition information. The presenting unit 104 then determines whether or not there is a parameter that satisfies the image capturing area and the range of an angle included in the selected composition information (a parameter of a camera that can capture a video image that has image composition represented by the selected composition information), from among the parameters of the cameras obtained by the obtaining unit 103. When, for example, composition information for a PTZ camera is selected as selected composition information, a parameter of a camera that brings the image capturing area included in the selected composition information, into the field of view such that the image capturing area has the largest possible size, and that allows the range of an angle included in the selected composition information to be included in the "controllable ranges of pan, tilt, and zoom" is specified as the "parameter that satisfies the image capturing area and the range of an angle included in the selected composition information". More specifically, for example, assume that the image capturing area and the range of an angle included in the selected composition information are respectively "upper half body" and "plus or minus 10 degrees from slant angle of 45 degrees". In that case, if the PTZ control information represents "350° (pan angle range)", "90° (tilt angle range)", and "3.5 times (optical zoom)", it is determined that there is no problem with pan and tilt, and that there is no problem if the camera can be physically arranged in an area where the upper half body of the subject is caught. Thus, in this case, a parameter that includes "350° (pan angle range)", "90° (tilt angle range)", and "3.5 times (optical zoom) as PTZ control information is specified as a parameter that satisfies the image capturing area and the range of an angle included in the selected composition information.

Note that, when a plurality of parameters that satisfy the image capturing area and the range of an angle included in the selected composition information are specified, a parameter of a camera that has the highest resolution, or a parameter of a camera that has higher performance such as a camera that has the highest frame rate may be specified.

If it is determined, as a result of the determination in step S502, that a parameter that satisfies the image capturing area and the range of an angle included in the selected composition information could be specified, the procedure advances to step S503. On the other hand, if it is determined in step S502 that a parameter that satisfies the image capturing area and the range of an angle included in the selected composition information could not be specified, the procedure advances to step S505. In step S505, the presenting unit 104 determines that there is no camera that can be arranged.

In step S503, the presenting unit 104 determines whether or not the parameter specified in step S502 as a "parameter that satisfies the image capturing area and the range of an angle included in the selected composition information" satisfies (covers) the movement area included in the selected composition information. If, for example, the movement area included in the selected composition information is "move in kitchen", an area A in map data of a kitchen in which a person can move is obtained. In a case of a parameter of a PTZ camera, if the parameter is a parameter including PTZ control information that makes it possible to perform control so as to achieve PTZ that enables image capturing of the area A, based on the movement area defined by the movement area information included in the parameter, it is determined that the parameter satisfies (covers) the movement area included in the selected composition information. In addition, in a case of a smartphone camera, if the parameter of the smartphone camera is a parameter that enables image capturing in the range A, based on the movement area defined by the movement area information included in the parameter, it is determined that the parameter satisfies (covers) movement area included in the selected composition information.

If it is determined, as a result of the determination, that the parameter specified in step S502 as a "parameter that satisfies the image capturing area and the range of an angle included in the selected composition information" satisfies (covers) the movement area included in the selected composition information, the procedure advances to step S504. On the other hand, if the parameter specified in step S502 as a "parameter that satisfies the image capturing area and the range of an angle included in the selected composition information" does not satisfy (does not cover) the movement area included in the selected composition information, the procedure advances to step S505. Note that, if the movement area included in the selected composition information is "fixed", the procedure advances to step S504 without the determination processing in step S503 being performed.

In step S504, the presenting unit 104 registers, in a list, the parameter specified in step S502 as a "parameter that satisfies the image capturing area and the range of an angle included in the selected composition information". No record is registered in the list in an initial state, and each time the processing of step S504 is performed, a parameter is registered in the list.

In step S506, the presenting unit 104 determines whether or not all of the pieces of composition information obtained in step S501 have been selected as selected composition information. If it is determined, as a result of the determination, that all of the pieces of composition information obtained in step S501 have been selected as selected composition information, the processing in the flowchart in FIG. 5 ends. The list that is obtained when the processing in the flowchart in FIG. 5 ends is used as arrangement information. On the other hand, if any piece of composition information that has not been selected as selected composition information remains from among the pieces of composition information obtained in step S501, the procedure advances to step S501.

As described above, according to the present embodiment, it is possible to generate and present proposed arrangement of cameras that are to capture a video image having an appropriate image composition, based on a situation of image capturing and parameters of the cameras that perform image capturing in the situation.

Modified Examples

A configuration and an operation method of each GUI are not respectively limited to a specific configuration and a specific operation method. FIGS. 6A and 6B show a configuration in which the numbers of two types of cameras of are input, for example, but a configuration may also be adopted in which the number of cameras for each of three or more types can be input. In addition, in the description of the first embodiment, operation input on a GUI is performed by the user performing an operation on the operation unit 207. However, there is no limitation thereto, and, for example, when a GUI is displayed on a touch panel screen, the user may perform operation input on the GUI by touching the touch panel screen, for example.

In addition, in the first embodiment, a case has been described in which a subject is a person, but a subject is not limited to a person, and a situation is also conceivable where an animal or nature is a main subject.

In addition, in the first embodiment, the order in which pieces of composition information are selected in step S502 is not particularly designated, but a configuration may be adopted in which a selecting order is set for the pieces of composition information, and the pieces of composition information are selected in the selecting order. A higher priority may be set, in advance, for a piece of composition information of image composition desired to be broadcast/distributed more predominantly, for example. In this case, in step S502, composition information is selected in the order of highest priority.

In addition, when an appropriate arrangement place cannot be secured, a message that an appropriate arrangement place cannot be secured and a reason for that may be presented. When an arrangement place is at the position of an obstacle on a map such as a wall, a warning "the camera cannot be disposed due to a wall", for example, may be presented.

Second Embodiment

In the following embodiments that include the present embodiment, differences from the first embodiment will be described, and the following embodiments are similar to the first embodiment, unless specifically stated otherwise below. In the present embodiment, proposed camera rearrangement of each camera that considers a change during image capturing performed by the camera is generated and is presented to the user.

The block diagram in FIG. 3 shows a configuration example of a system according to the present embodiment that includes the information processing apparatus 100. In the system according to the present embodiment, as shown in FIG. 3, a switcher 307 is connected to the information processing apparatus 100, in addition to a plurality of cameras that include the cameras 105, 106, and 107. In addition, a distribution service server 309 is connected to the above-described network, and the information processing apparatus 100 can transmit/receive data to/from the distribution service server 309 via the network.

Figure 11:
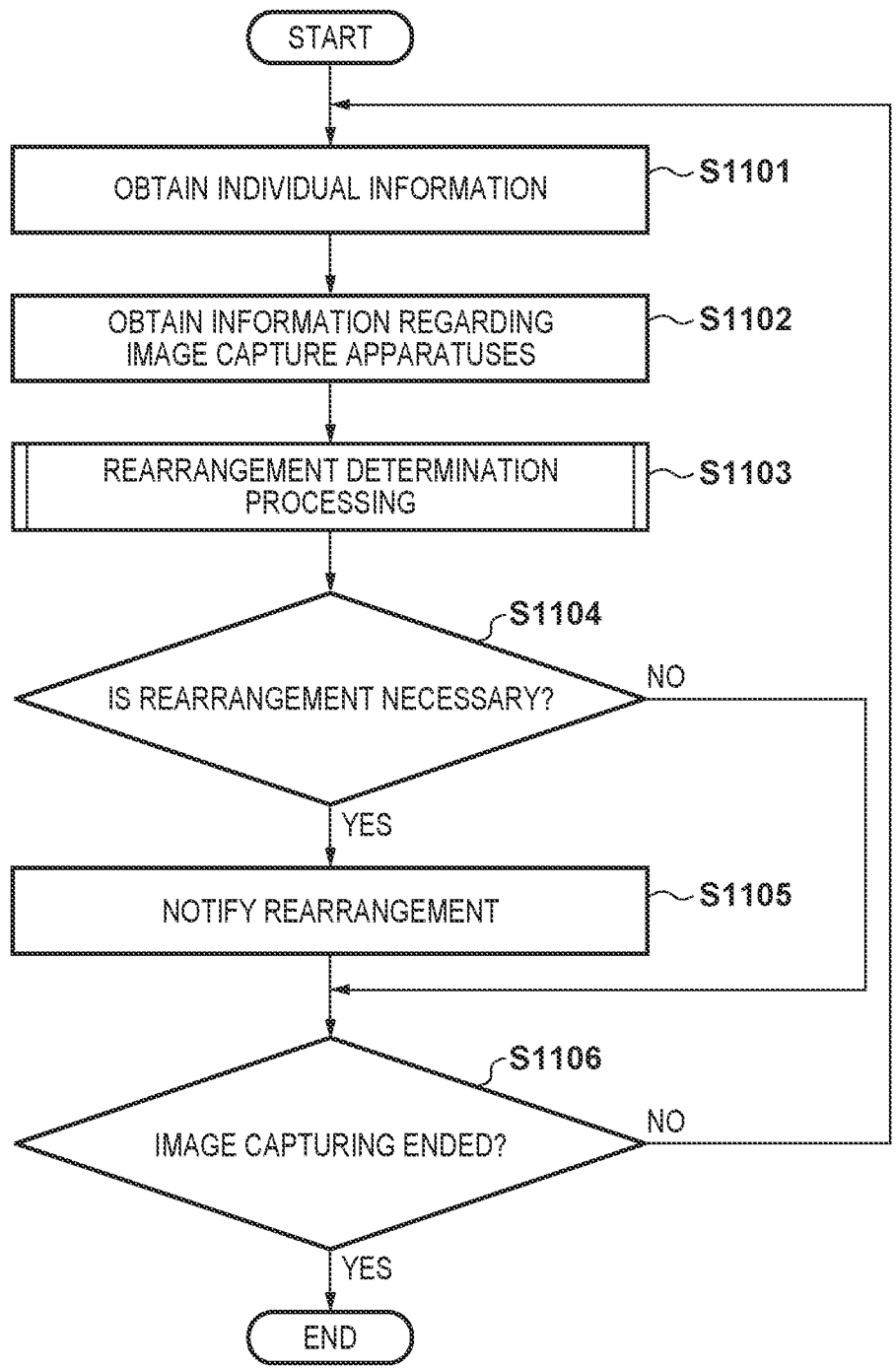
FIG. 11 is a flowchart of processing that is performed by the information processing apparatus 100.

As shown in FIG. 3, the information processing apparatus 100 includes an obtaining unit 301, an obtaining unit 302, and a determination unit 303. In the present embodiment, a case will be described in which these functional units are implemented as software (computer programs). Description may be given assuming that these functional units perform processing, but, as a matter of fact, functions of the functional units are realized by the CPU 201 executing computer programs corresponding to the functional units. Note that one or more out of these functional units may be implemented by as hardware. Operations of the information processing apparatus 100 according to the present embodiment will be described with reference to the flowchart in FIG. 11.

In step S1101, the obtaining unit 301 obtains information (individual information) regarding the cameras connected to the information processing apparatus 100. A method for obtaining individual information of each camera is not limited to a specific obtaining method, and individual information of each camera may be obtained from the camera via the above-described network, or may be obtained from a server (such as the distribution service server 309) for managing individual information of the cameras, via the above-described network.

FIG. 12 shows a configuration example of individual information of a camera. "Position information" is information that includes the position of the camera and a condition for rearrangement. "PTZ control information" is information included in individual information of a PTZ camera, and includes the values of pan, tilt, zoom, and a condition for rearrangement. "The number of pieces of applied metadata" is information that includes the number of times a specific movement of a subject was detected in a video image obtained from the camera, and a condition for rearrangement. The number of times is obtained using a known video image analysis technique. Each time specific movement of a subject is detected in a video image, data representing a frame section of the specific movement of the subject or the like is generated as metadata of the video image, and thus the number of pieces of generated metadata is used as the number of pieces of applied metadata.

In step S1102, the obtaining unit 302 obtains the individual information obtained by the obtaining unit 301. Moreover, the obtaining unit 302 obtains information regarding the image capture apparatuses from the switcher 307 and the distribution service server 309. FIG. 13 shows an example of the information regarding the image capture apparatuses that is obtained from the switcher 307 and the distribution service server 309.

"Switching ratios" is information regarding the image capture apparatuses that is obtained from the switcher 307, and includes ratios at with a switch was made to the cameras and a condition for rearrangement. In the example in FIG. 13, ratios at which a switch was made to the camera 105 (a camera A), the camera 106 (a camera B), and the camera 107 (a camera C) are respectively 10%, 40%, and 50%, and the condition for rearrangement is "10% or lower".

"Distribution ratios" is information regarding the image capture apparatuses that is obtained from the distribution service server 309, and includes "a ratio of each video image distributed as a sub video image not as a main video image" and a condition for rearrangement. The example in FIG. 13 represents that 20% of a distributed sub video image is a video image captured by the camera A, 30% of the distributed sub video image is a video image captured by the camera B, and 50% of the distributed sub video image is a video image captured by the camera C. In addition, a distribution ratio being "lower than 25%" is set as the condition for rearrangement.

"Ratios of the numbers of pieces of applied metadata" is information regarding the image capture apparatuses that is obtained from the distribution service server 309, and includes the ratios of the numbers of pieces of metadata applied to the cameras and a condition for rearrangement. In the example in FIG. 13, 7% (two pieces) of metadata obtained by the information processing apparatus 100 is metadata corresponding to the camera A. In addition, 37% (10 pieces) of the metadata obtained by the information processing apparatus 100 is metadata corresponding to the camera B. In addition, 55% (15 pieces) of the metadata obtained by the information processing apparatus 100 is metadata corresponding to the camera C. In addition, a ratio of the number of pieces of applied metadata being "lower than 10%" is set as the condition for rearrangement. Note that, regarding which piece of information regarding the image capture apparatuses is generated by which apparatus and is obtained from which apparatus, there is no limitation to a specific mode.

In step S1103, the determination unit 303 determines whether or not rearrangement of each camera is necessary (whether or not each camera needs to be rearranged), based on the individual information and the information regarding the image capture apparatuses obtained by the obtaining unit 302. In the example in FIG. 13, determination as to whether or not rearrangement of the camera is necessary is performed based on each of position information, PTZ control information, the number of pieces of applied metadata, a switching ratio, a distribution ratio, and a ratio of the number of pieces of applied metadata.

In determination regarding "position information", determination is performed as to whether or not the position information of each of the camera A, the camera B, and the camera C satisfies the condition for rearrangement related to the "position information". In determination regarding "PTZ control information", determination is performed as to whether or not the PTZ values of each of the camera A, the camera B, and the camera C satisfies the condition for rearrangement related to the "PTZ control information". In determination regarding "the number of pieces of applied metadata", determination is performed as to whether or not the number of pieces of metadata applied to each of the camera A, the camera B, and the camera C satisfies the condition for rearrangement related to "the number of pieces of applied metadata". In determination regarding "switching ratio", determination is performed as to whether or not the switching ratio of each of the camera A, the camera B, and the camera C satisfies the condition for rearrangement related to the "switching ratio". In determination regarding "distribution ratio", determination is performed as to whether or not the distribution ratio of each of the camera A, the camera B, and the camera C satisfies a condition for rearrangement related to the "distribution ratio". In determination regarding "ratio of the number of pieces of applied metadata", determination is performed as to whether or not the ratio of the numbers of pieces of metadata applied to each of the camera A, the camera B, and the camera C satisfies the condition for rearrangement related to the "ratio of the number of pieces of applied metadata".

Figure 14:
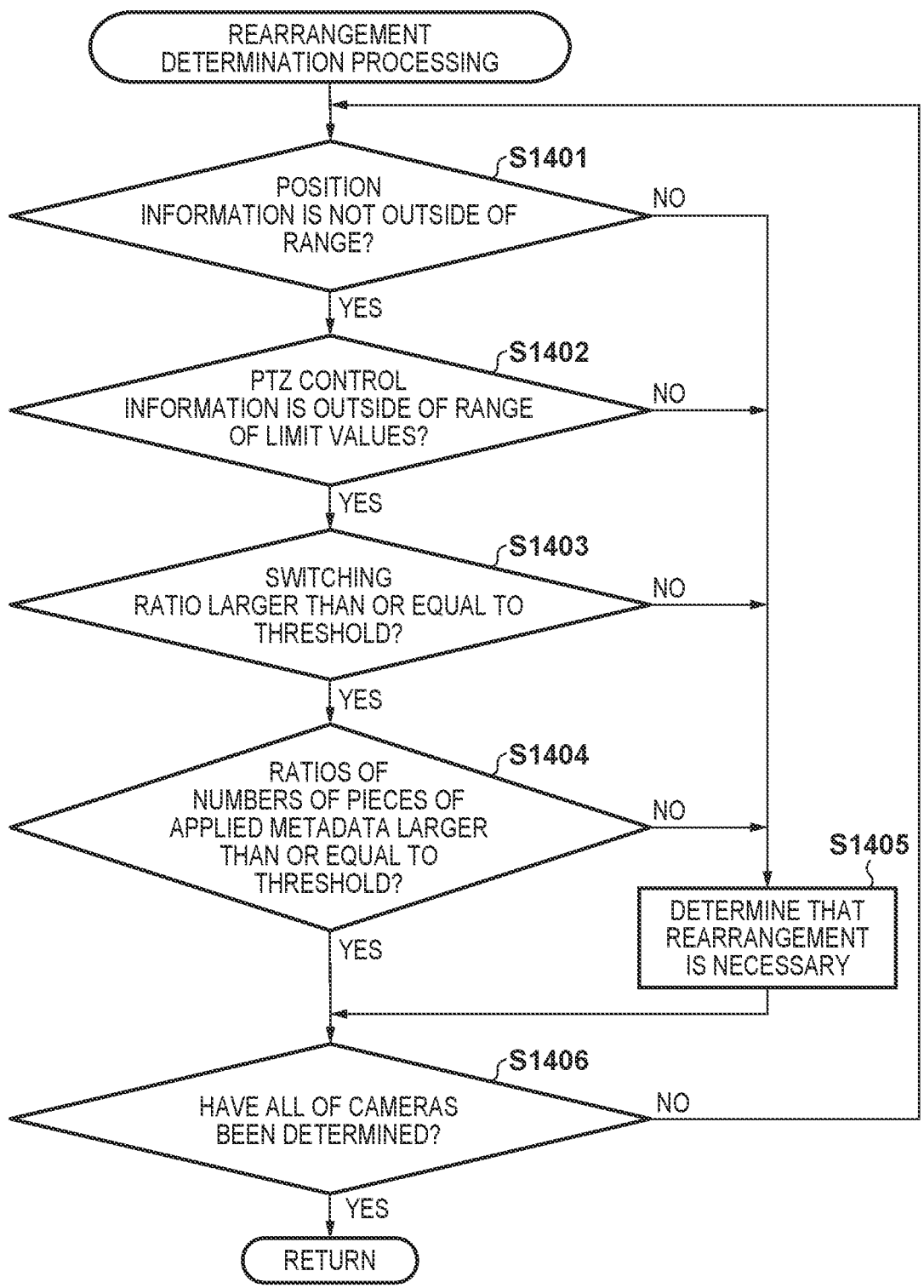
FIG. 14 is a diagram showing an example of detailed processing of step S1103.

In the example in FIG. 13, if, in the determination regarding the requirements of "position information", "PTZ control information", "the number of pieces of applied metadata", "switching ratio", "distribution ratio", and "ratio of the number of pieces of applied metadata", there is a single requirement determined as satisfying a condition for rearrangement, it is determined that camera rearrangement is necessary. On the other hand, if, in the determination regarding the requirements, there is no requirement determined as satisfying a condition for rearrangement, it is determined that camera rearrangement is not necessary. An example of the processing of step S1103 will be described in detail with reference to the flowchart in FIG. 14.

In step S1401, the determination unit 303 determines whether or not position information of each camera satisfies a condition for rearrangement related to the "position information". If it is determined, as a result of the determination, that the condition for rearrangement is satisfied, it is conceivable that the camera is outside a movement area thereof envisioned before image capturing, for example, and thus it is determined that rearrangement of the camera is necessary, and the procedure advances to step S1405. On the other hand, if it is determined that the condition for rearrangement is not satisfied, the procedure advances to step S1402. In the example in FIG. 12, if a condition that the latitude on which the camera is arranged is outside a range of 35.56 to 35.57 and the longitude on which the camera is arranged is outside a range of 139.68 to 139.69 is satisfied, it is determined that the position information of the camera satisfies the condition for rearrangement. On the other hand, if the above condition is not satisfied, it is determined that the position information of the camera does not satisfy the condition for rearrangement.

In step S1402, the determination unit 303 determines whether or not PTZ values of each camera satisfy a condition for rearrangement related to the "PTZ control information". If it is determined, as a result of the determination, that the condition for rearrangement is satisfied, it is conceivable a limit value of an image capturing area of a subject envisioned before image capturing is outside the image capturing area, for example, and thus the procedure advances to step S1405. On the other hand, if it is determined that the condition for rearrangement is not satisfied, the procedure advances to step S1403. In the example in FIG. 12, if a condition that the pan angle of the camera is within a range of pan angle limits (330 to 350°), the tilt angle of the camera is within a range of tilt angle limits (80 to 90°), and the optical zoom of the camera is within a range of optical zoom limits (3.3 to 3.5 times) is satisfied, it is determined that the PTZ control information of the camera satisfies the condition for rearrangement. On the other hand, if the above condition is not satisfied, it is determined that the PTZ control information of the camera does not satisfy the condition for rearrangement.

Note that it is highly likely that there is no problem if frames in which PTZ control information takes a limit value are consecutive for a certain period of time or shorter, for example, in a certain number of frames for one minute. In that case, determination may be performed as to whether or not rearrangement is necessary depending on whether or not the frames in which PTZ control information takes a limit value are consecutive for a preset period of time.

In step S1403, the determination unit 303 determines whether or not the switching ratio of each camera satisfies the condition for rearrangement related to the "switching ratio". If it is determined, as a result of the determination, that the condition for rearrangement is satisfied, the procedure advances to step S1405, and, if it is determined that the condition for rearrangement is not satisfied, the procedure advances to step S1404. In the example in FIG. 12, if the switching ratio is lower than 10%, it is determined that the switching ratio satisfies a condition for rearrangement, and, if the switching ratio is higher than or equal to 10%, it is determined that the switching ratio does not satisfy the condition for rearrangement.

In step S1404, the determination unit 303 determines whether or not the ratio of the number of pieces of metadata applied to each camera satisfy a condition for rearrangement related to the "ratio of the number of pieces of applied metadata". As a result of this determination, if it is determined that the condition for rearrangement is satisfied, the procedure advances to step S1405, and, if it is determined that the condition for rearrangement is not satisfied, the procedure advances to step S1406. In the example in FIG. 12, if the ratio of the number of pieces of applied metadata is lower than 10%, it is determined that the ratio of the number of pieces of applied metadata satisfies the condition for rearrangement, and if the ratio of the number of pieces of applied metadata is higher than or equal to 10%, it is determined that the ratio of the number of pieces of applied metadata does not satisfy the condition for rearrangement.

In step S1405, the determination unit 303 determines that rearrangement is necessary. In step S1406, the determination unit 303 determines whether or not loop processing of steps S1401 to S1405 has been performed on all of the cameras. If it is determined, as a result of the determination, that the loop processing of steps S1401 to S1405 has been performed on all of the cameras, the procedure advances to step S1104. On the other hand, if there is a camera that has not been subjected to the loop processing of steps S1401 to S1405, the procedure advances to step S1401 in order to perform the loop processing on the camera that has not been subjected to the loop processing.

Note that there is individual information or information regarding image capture apparatuses that is not used in above-described determination processing, but, such information may be used as necessary. When, for example, a captured video image is being distributed via a network, processing for determining whether or not to perform rearrangement using a distribution ratio may be added.

If it is determined, as a result of the determination, that camera rearrangement is necessary, the procedure advances to step S1105 via step S1104, and if it is determined that camera rearrangement is not necessary, the procedure advances to step S1106 via step S1104.

Figure 15:
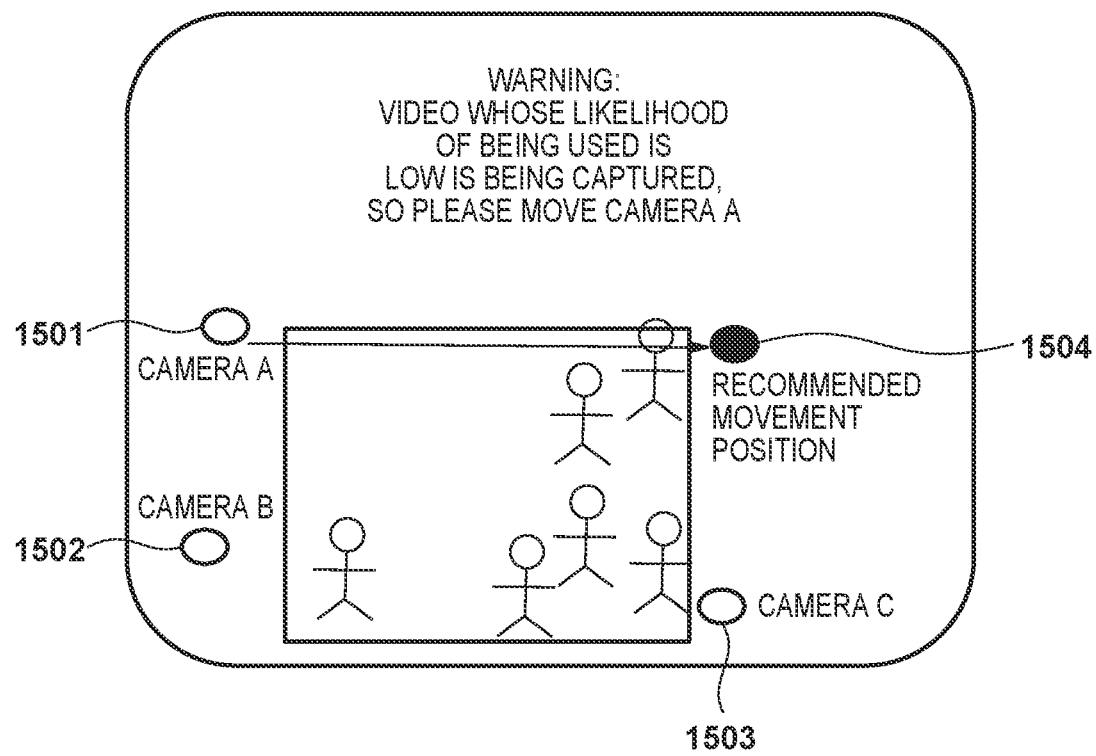
FIG. 15A is a diagram showing a display example of a message that rearrangement of a camera A is necessary.
FIG. 15B is a diagram showing a display example in which a recommended rearrangement position is indicated on a map.

In step S1105, the presenting unit 104 presents a message that rearrangement is necessary. The presenting unit 104 causes the display unit 208 to display a message that rearrangement is necessary, for example. When, for example, the individual information shown in FIG. 12 is individual information of the camera A, none of the position information, the PTZ control information, and the number of pieces of applied metadata satisfy a condition for rearrangement. However, in this case, the presenting unit 104 causes the display unit 208 to display a message that rearrangement of the camera A is necessary, as shown in FIG. 15A. In addition, for example, as shown in FIG. 13, both the distribution ratio and ratio of the number of the pieces of applied metadata regarding the camera A do not satisfy a condition for rearrangement, and thus the presenting unit 104 causes the display unit 208 to display a message that rearrangement of the camera A is necessary, as shown in FIG. 15A.

Note that a message displayed by the presenting unit 104 may be a recommended rearrangement position indicated on a map, as shown in FIG. 15B. Blank circles 1501 to 1503 respectively represent the positions of the camera A, the position of the camera B, and the camera C, and a black circle 1504 represent a recommended rearrangement position. The position of a camera is obtained from the individual information of the camera. A recommended rearrangement position can be a position near a camera to which a large number of pieces of metadata are applied, or a position where no camera is disposed, for example. In addition, a recommended rearrangement position may be obtained using a CNN trained with recommended positions of cameras, or the like.

In step S1106, the determination unit 303 determines whether or not all of the cameras have ended image capturing. If it is determined, as a result of the determination, that all of the cameras have ended image capturing, the processing in the flowchart in FIG. 11 ends. On the other hand, if there is a camera that has not ended image capturing, the procedure advances to step S1101.

Note that there may be no change if the processing is promptly repeated, and thus stand-by processing for any period of time (for example, processing for waiting for five minutes) may be provided before returning to step S1101 such that proposed rearrangement can be efficiently presented.

As described above, according to the present embodiment, proposed camera rearrangement that considers a change during image capturing is generated based on information that can be obtained while a video image is being captured, and the generated proposed rearrangement can be presented to the user.

Third Embodiment

Figure 16:
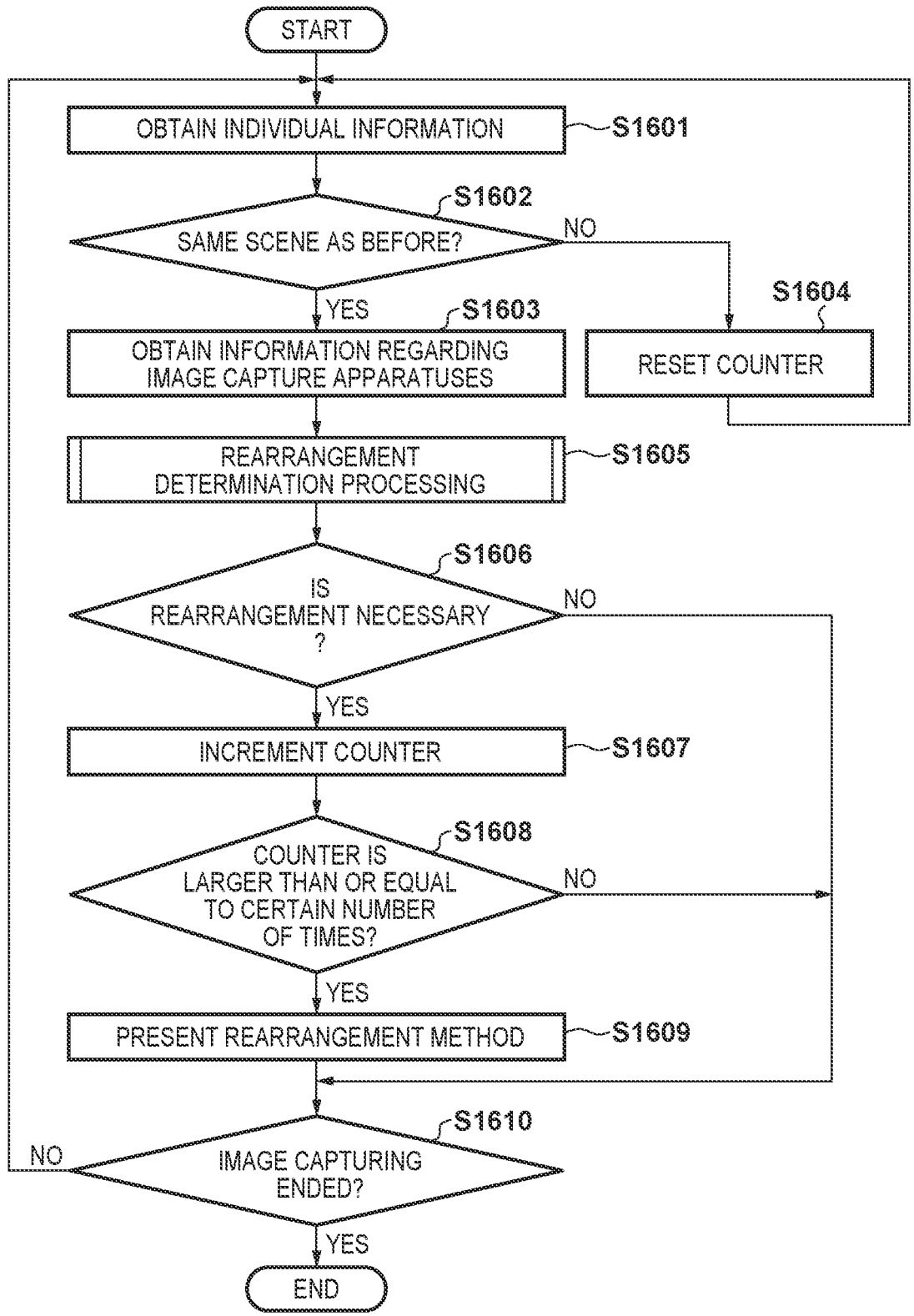
FIG. 16 is a flowchart of processing that is performed by the information processing apparatus 100.

In the present embodiment, in addition to the configuration in the second embodiment, proposed camera rearrangement that considers a case where there is a switch of scene such as a switch of circumstances or case is generated and presented. A configuration of a system according to the present embodiment is similar to that in the second embodiment (FIG. 3). Processing that is performed by the information processing apparatus 100 in order to generate and present proposed camera rearrangement in accordance with a change in scene that is captured in an image will be described with reference to the flowchart in FIG. 16.

In step S1601, the obtaining unit 301 obtains information (individual information) regarding each of the cameras connected to the information processing apparatus 100, and obtains a video image captured by the camera.

In step S1602, regarding each of the cameras connected to the information processing apparatus 100, the obtaining unit 301 determines whether or not a scene in the video image obtained from the camera in step S1601 of the current processing is the same as a scene in the video image obtained from the camera in step S1601 of the previous processing. In other words, determination is performed as to whether or not there was a switch of scene in the obtained video image. For detection of a switch of scene in a video image, movement recognition that is a known technique is used, or there is a known technique for determining whether or not the current scene is the same as a previous scene based on the similarity to a past video image.

If it is determined, as a result of the determination, that the current scene is the same as the previous scene (if it is determined that there was no switch of scene), the procedure advances to step S1603. On the other hand, if it is determined that the current scene is not the same as the previous scene (if it is determined that there was a switch of scene), the procedure advances to step S1604.

In step S1603, similarly to the above step S1102, the obtaining unit 302 obtains individual information obtained by the obtaining unit 301, and obtains information regarding the image capture apparatuses from the switcher 307 and the distribution service server 309.

In step S1605, similarly to the above step S1103, the determination unit 303 determines whether or not camera rearrangement is necessary (whether or not each camera needs to be rearranged), based on the individual information and the information regarding the image capture apparatuses obtained by the obtaining unit 302.

If it is determined, as a result of the determination, that camera rearrangement is necessary, the procedure advances to step S1607 via step S1606, and if it is determined that camera rearrangement is not necessary, the procedure advances to step S1610 via step S1606.

In step S1607, the determination unit 303 increments, by one, the value of a counter for counting the number of times determination was performed as to whether or not camera rearrangement is necessary. Assume that the value of the counter was initialized to 0 before the processing in the flowchart in FIG. 16 was started.

In step S1608, the determination unit 303 determines whether or not the value of the counter is larger than or equal to a threshold value (a certain number of times: for example, three times). If it is determined, as a result of the determination, that the value of the counter is larger than or equal to the threshold value, the procedure advances to step S1609, and if the value of the counter is smaller than the threshold value, the procedure advances to step S1610.

Providing the threshold value reduces easy presentation of rearrangement. In step S1609, similarly to the above step S1105, the presenting unit 104 presents a message that rearrangement is necessary.

In step S1610, similarly to the above step S1106, the determination unit 303 determines whether or not all of the cameras have ended image capturing. If it is determined, as a result of the determination, that all of the cameras have ended image capturing, the processing in the flowchart in FIG. 16 ends. On the other hand, if there is a camera that has not ended image capturing, the procedure advances to step S1601.

In the meantime, in step S1604, the determination unit 303 initializes (resets) the value of the counter to 0. The procedure then advances to step S1601. Accordingly, the influence from rearrangement due to different scenes is reduced.

As described above, according to the present embodiment, it is possible to generate and present proposed camera rearrangement that also considers a case where there was a switch of scene such as a switch of circumstances or case.

Fourth Embodiment

Figure 17:
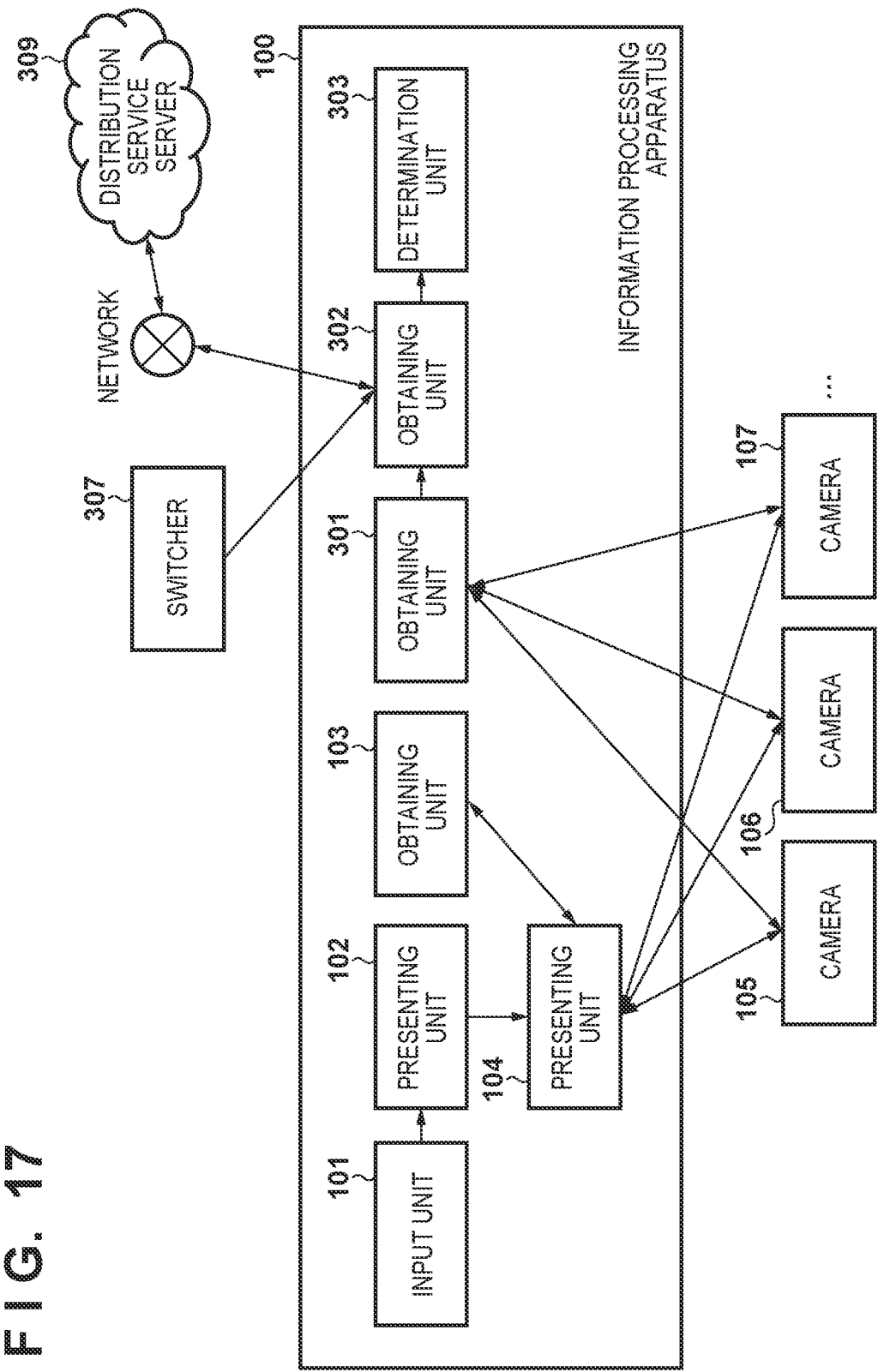
FIG. 17 is a block diagram showing a configuration example of a system.

In the first embodiment, before image capturing is started using cameras, proposed arrangement of the cameras for making it possible to capture a video image that has an appropriate configuration suitable for a situation of the image capturing is generated and presented to the user. In addition, in the second embodiment, proposed camera rearrangement that considers a change during image capturing performed by the cameras is generated and is presented to the user. In the present embodiment, the information processing apparatus 100 that has a configuration in which, before image capturing is started using cameras, proposed arrangement of the cameras is generated and is presented to the user, and a configuration in which proposed cameras rearrangement is generated during image capturing performed by the cameras and is presented to the user will be described. The block diagram in FIG. 17 shows a configuration example of a system that includes the above information processing apparatus 100. Note that the information processing apparatus 100 that has such a configuration performs the operation described in the first embodiment and the operation described in the second embodiment. Note that the operation described in the third embodiment may be executed in addition to or in place of the operation described in the second embodiment.

In addition, the numerical values, the processing timings, the processing orders, which unit performs processing, the obtaining methods/transmission destinations/transmission sources/storage places of data (information), the configurations and operation methods of the GUIs, and the like used in the above embodiments and modified examples are used as examples in order to give specific description, and there is no intention of limiting the present disclosure to such examples.

In addition, some or all of the above embodiments and modified examples may be used in combination as appropriate. In addition, some or all of the above embodiments and modified examples may be selectively used.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-086234, filed May 26, 2022, which is hereby incorporated by reference herein in its entirety.

What is claimed is:

1. An information processing apparatus connected to at least one image capture apparatus configured to capture subjects, the information processing apparatus comprising:
one or more processors; and
one or more memories storing executable instructions which, when executed by the one or more processors, cause the information processing apparatus to function as:
a first obtaining unit configured to obtain situation information representing a situation of image capturing, wherein the situation information includes at least information on a category of content;
a second obtaining unit configured to obtain composition information representing image composition requested for image capturing in the situation, based on the situation information, wherein the composition information includes information on an image capturing area of a subject, and information on a range of an angle of the at least one image capture apparatus relative to the subject;
a third obtaining unit configured to obtain a parameter of the at least one image capture apparatus, wherein the parameter of the at least one image capture apparatus includes a position of the at least one image capture apparatus and an area in which the at least one image capture apparatus is movable; and
a generating unit configured to generate arrangement information representing a proposed arrangement of an image capture apparatus that performs image capturing in the situation, based on the composition information and the parameter.

2. The information processing apparatus according to claim 1,
wherein the first obtaining unit obtains the situation information input by a user.

3. The information processing apparatus according to claim 1,
wherein the situation information further includes information on number of subjects, and information on number of image capture apparatuses for each type.

4. The information processing apparatus according to claim 1, wherein the second obtaining unit obtains the composition information corresponding to the situation information obtained by the first obtaining unit, from pieces of composition information registered for respective pieces of situation information in advance.

5. The information processing apparatus according to claim 1,
wherein the composition information further includes information related to an area in which the subject can move.

6. The information processing apparatus according to claim 1,
wherein the parameter of the at least one image capture apparatus further includes ranges in which pan, tilt, and zoom are controllable.

7. The information processing apparatus according to claim 1,
wherein the generating unit generates the arrangement information using the parameter of the at least one image capture apparatus that is determined as making it possible to capture a video image that has image composition defined by the composition information.

8. The information processing apparatus according to claim 1,
wherein the generating unit generates the arrangement information using the parameter of the at least one image capture apparatus that is determined as making it possible to capture a video image that has image composition defined by the composition information, in order from composition information of the highest priority based on priorities set in advance for each of composition information.

9. The information processing apparatus according to claim 1, wherein the one or more processors are further programmed to cause the information processing apparatus to function as:
a unit configured to present the composition information obtained by the second obtaining unit.

10. The information processing apparatus according to claim 1, wherein the one or more processors are further programmed to cause the information processing apparatus to function as:
a presenting unit configured to present the arrangement information generated by the generating unit.

11. The information processing apparatus according to claim 1, wherein the one or more processors are further programmed to cause the information processing apparatus to function as:
a determination unit configured to determine whether or not the at least one image capture apparatus needs to be rearranged; and
a determination result presenting unit configured to present a result of determination performed by the determination unit.

12. The information processing apparatus according to claim 11,
wherein the determination unit determines whether or not the at least one image capture apparatus needs to be rearranged, in accordance with whether or not at least one of a position of the at least one image capture apparatus, PTZ values of the at least one image capture apparatus, number of times a specific movement of a subject was detected in a video image captured by the at least one image capture apparatus a switching ratio at which a switch was made to the at least one image capture apparatus, and a distribution ratio of each video image distributed by the at least one image capture apparatus as a sub video image not as a main video image satisfies a condition for rearrangement.

13. The information processing apparatus according to claim 11,
wherein the determination result presenting unit further presents a recommended rearrangement position of the at least one image capture apparatus.

14. The information processing apparatus according to claim 11,
wherein the determination result presenting unit presents a result of determination performed by the determination unit, when a number of times it was determined that rearrangement of the at least one image capture apparatus is necessary in a state where a switch of scene has not been detected in a video image is larger than or equal to a threshold value.

15. An information processing method that is performed by an information processing apparatus connected to at least one image capture apparatus configured to capture subjects, the method comprising:
obtaining situation information representing a situation of image capturing, wherein the situation information includes at least information on a category of content;
obtaining composition information representing image composition requested for image capturing in the situation, based on the situation information, wherein the composition information includes information on an image capturing area of a subject, and information on a range of an angle of the at least one image capture apparatus relative to the subject;
obtaining a parameter of the at least one image capture apparatus, wherein the parameter of the at least one image capture apparatus includes a position of the at least one image capture apparatus and an area in which the at least one image capture apparatus is movable; and
generating arrangement information representing a proposed arrangement of an image capture apparatus that performs image capturing in the situation, based on the composition information and the parameter.

16. A non-transitory computer-readable storage medium that stores a computer program for causing a computer to function as:
a first obtaining unit configured to obtain situation information representing a situation of image capturing, wherein the situation information includes at least information on a category of content;
a second obtaining unit configured to obtain composition information representing image composition requested for image capturing in the situation, based on the situation information, wherein the composition information includes information on an image capturing area of a subject, and information on a range of an angle of at least one image capture apparatus relative to the subject;
a third obtaining unit configured to obtain a parameter of the at least one image capture apparatus, wherein the parameter of the at least one image capture apparatus includes a position of the at last one image capture apparatus and an area in which the at least one image capture apparatus is movable; and
a generating unit configured to generate arrangement information representing a proposed arrangement of an image capture apparatus that performs image capturing in the situation, based on the composition information and the parameter.

* * * * *